(12) United States Patent
Rhee

(10) Patent No.: US 6,930,728 B2
(45) Date of Patent: Aug. 16, 2005

(54) SCAN CONVERSION APPARATUS

(75) Inventor: Seung Hyeon Rhee, Seoul (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 09/882,614

(22) Filed: Jun. 15, 2001

(65) Prior Publication Data

US 2002/0001347 A1 Jan. 3, 2002

(30) Foreign Application Priority Data

Jun. 22, 2000 (KR) .......................................... 2000-34561

(51) Int. Cl.[7] .............................................. H04N 7/01
(52) U.S. Cl. ....................... 348/448; 348/452; 348/458; 348/459
(58) Field of Search ................................. 348/448, 458, 348/452, 449, 447, 450, 451, 459, 699

(56) References Cited

U.S. PATENT DOCUMENTS

| | | | | |
|---|---|---|---|---|
| 5,363,146 A | * | 11/1994 | Saunders et al. | 348/699 |
| 5,412,435 A | * | 5/1995 | Nakajima | 348/699 |
| 5,428,397 A | * | 6/1995 | Lee et al. | 348/448 |
| 5,430,490 A | * | 7/1995 | Rim | 348/452 |
| 5,453,799 A | * | 9/1995 | Yang et al. | 348/699 |
| 5,619,272 A | * | 4/1997 | Salmon et al. | 348/452 |
| 5,638,139 A | * | 6/1997 | Clatanoff et al. | 348/701 |
| 5,661,525 A | * | 8/1997 | Kovacevic et al. | 348/452 |
| 5,687,097 A | * | 11/1997 | Mizusawa | 345/474 |
| 5,689,305 A | * | 11/1997 | Ng et al. | 348/416 |
| 5,790,208 A | * | 8/1998 | Kwak et al. | 348/697 |
| 5,936,676 A | * | 8/1999 | Ledinh et al. | 348/452 |
| 5,995,154 A | * | 11/1999 | Heimburger | 348/448 |
| 6,034,734 A | * | 3/2000 | De Haan et al. | 348/458 |
| 6,108,039 A | * | 8/2000 | Linzer et al. | 348/398 |
| 6,151,075 A | * | 11/2000 | Shin et al. | 348/459 |
| 6,192,080 B1 | * | 2/2001 | Sun et al. | 375/240.16 |
| 6,219,103 B1 | * | 4/2001 | Sugiyama | 348/452 |
| 6,509,930 B1 | * | 1/2003 | Hirano et al. | 348/452 |
| 6,526,096 B2 | * | 2/2003 | Lainema et al. | 375/240.16 |
| 6,545,719 B1 | * | 4/2003 | Topper | 348/448 |
| 6,606,126 B1 | * | 8/2003 | Lim et al. | 348/452 |
| 6,614,484 B1 | * | 9/2003 | Lim et al. | 348/448 |
| 6,618,094 B1 | * | 9/2003 | De Haan et al. | 348/448 |
| 6,618,439 B1 | * | 9/2003 | Kuo et al. | 375/240.16 |

FOREIGN PATENT DOCUMENTS

| | | | | |
|---|---|---|---|---|
| KR | 1999-25249 | 4/1999 | | H04N/7/01 |

OTHER PUBLICATIONS

U.S. Appl. No. 08/934,307, filed May 2002, Lainema et al.*

* cited by examiner

Primary Examiner—Paulos M. Natnael
(74) Attorney, Agent, or Firm—Lee, Hong, Degerman, Kang & Schmadeka

(57) ABSTRACT

An apparatus and a method for converting image signals from an interlaced scanning format to a progressive scanning format are disclosed. Additionally, an apparatus and a method for changing a vertical scanning rate of progressively scanned image signals are also disclosed. Field motion estimator estimates field motions between a current field and reference fields to find an optimal reference field. Then a field motion compensator restores a missing line of the current field using information given from the optimal reference if the optimal reference field unevenly matches to the current field. Otherwise, a linear interpolator restores the missing line of the current field by linearly interpolating lines located adjacent to the missing line in the current field. Furthermore, a frame motion estimator estimates frame motions between adjacent frames using the progressively scanned image signals and field motions estimated in the field motions estimator. Finally, a frame motion compensator provides a new composite image between the adjacent frames using the frame motions estimated.

6 Claims, 4 Drawing Sheets field1  field2  field3  field4 field1  field2  field3  field4

SCAN CONVERSION APPARATUS

CROSS REFERENCE TO RELATED ART

This application claims the benefit of Korean Patent Application No. 2000-34561, filed on Jun. 22, 2000, which is hereby incorporated by reference in its entirety.

BACKGROUND OF THE INVENTION

1. Field of the Invention

The present invention relates to converting the format of image signals from an interlaced scanning to a progressive scanning, and more particularly, to an apparatus and a method for converting to a progressive scanning format which restores the line data missing from each field of an image by analyzing motions of corresponding reference fields of the image.

2. Background of the Related Art

Recently, digital image devices such as digital televisions and DVDs became so popular so that they now coexist with analog image devices such as conventional television systems. Therefore, it is necessary to display analog signals on the digital devices. Generally, the analog TV image signals have an interlaced scanning format, so it is required to increase the scanning or resolution rate of the signals in order to properly display them on a high quality display unit. For that reason, the signals having the interlaced scanning format should be converted to a progressive scanning format.

According to a typical method currently being used for such format transformations, values of pixels corresponding to two lines adjacent to a missing line in a field are analyzed and their average values are being used to estimate values of pixels corresponding to the missing line.

After deciding whether there is any motion of the image by analyzing pixel values of the frame or adjacent field, average values obtained from the corresponding field are used if there is any movement, and otherwise, the pixel values in a prior or next field are used to estimate the missing line. This is because checking an existence of the motion is comparatively simpler than estimating a degree/amount of the motion, and it involves less number of calculations.

However, even if there is any very small amount of the movement in the image, the pixel values must be obtained only from information given from the current field, causing inefficient uses of available information, and the spatial resolution of the screen is reduced so that the display quality is significantly degraded.

As a matter of fact, moving image data are constantly changing, but we can only presume that adjacent picture frames have high correlations to each other, and the levels of such movements are quite insignificant. Therefore, if we are able to utilize not only characteristics of the reference frames, but also amounts of their movements, the resolution of the image can be greatly enhanced while the missing data can be restored with values closer to the actual values.

The conversion to the progressive scanning format utilizing the amounts of frame motions will also have a substantial effect to improve a vertical scanning rate (refresh or frame rate). As it can be seen from the case of changing a frequency from 24 Hz, which is used for films, to 30 Hz for NTSC televisions, it is important to increase the vertical scanning rate X times, where X is a non-integer (i.e., X=1.5). In order to achieve this, it is more efficient to make composite images between given image frames using the information given from the image motions. Otherwise, the cumulative error will be increased significantly.

SUMMARY OF THE INVENTION

Accordingly, the present invention is directed to a an apparatus and a method for converting to a progressive scanning format that substantially obviates one or more problems due to limitations and disadvantages of the related art.

An object of the present invention is to provide an apparatus and a method for converting to a progressive scanning format by taking pixel values from a prior or next field to estimate the pixel values corresponding to a missing line in a current field based on image motion information estimated from the moving image.

Another object of the present invention is to provide an apparatus and a method for converting to the progressive scanning format, wherein the apparatus includes a composite structure consisted of a part using current field information and the other part using prior or next field information based on the motion information estimated from the moving image.

Another object of the present invention is to provide an apparatus for changing a vertical scanning rate of the image signals by using the motion information estimated from the moving image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a apparatus for converting image signals from an interlaced scanning format to a progressive scanning format includes the following: a field motion estimator that estimates field motions between a current field and reference fields, the reference fields being prior or next to the current field; a field motion compensator that restores a missing line of the current field using information given from an optimal reference field if the optimal reference field unevenly matches to the current field, the optimal reference field being one of the reference fields having the shortest distance to the current field; a linear interpolator that restores the missing line of the current field by linearly interpolating lines located adjacent to the missing line in the current field if the optimal reference field evenly matches to the current field; an edge-preserving filter for smoother slanting lines of an image of the image signals; and a field buffer that stores the current field and the reference fields and provides them to the field motion estimator and the field motion compensator.

In another aspect of the present invention, a apparatus for changing a vertical scanning rate of progressively scanned image signals includes the following: a field motion estimator that estimates field motions between a current field and reference fields, the reference fields being prior or next to the current field; a field motion compensator that restores a missing line of the current field using information given from an optimal reference field if the optimal reference field unevenly matches to the current field, the optimal reference field being one of the reference fields having the shortest distance to the current field; a frame motion estimator that estimates frame motions between adjacent frames using the progressively scanned image signals and field motion estimated in the field motion estimator; a frame motion compensator that provides a new composite image between the adjacent frames using the frame motions estimated in the frame motion estimator; a linear interpolator that restores the missing line of the current field by linearly interpolating lines located adjacent to the missing line in the current field if the optimal reference field evenly matches to the current field; an edge-preserving filter for smoother slanting lines of an image of the image signals; a field buffer that stores the current field and the reference fields and provides them to the field motion estimator and field motion compensator; and a frame buffer that stores the progressively scanned image signals and outputs the signals to the frame motion estimator and the frame motion compensator.

In another aspect of the present invention, a method for converting image signals from an interlaced scanning format to a progressive scanning format includes: estimating field motions between a current field and reference fields, the reference fields being prior or next to the current field; restoring a missing line of the current field using information given from an optimal reference field if the optimal reference field unevenly matches to the current field, the optimal reference field being one of the reference fields having the shortest distance to the current field; restoring the missing line of the current field by linearly interpolating lines located adjacent to the missing line in the current field if the optimal reference field evenly matches to the current field; making smoother slanting lines of an image of the image signals by using an edge-preserving filter; and storing the current field and the reference fields in a field buffer.

In another aspect of the present invention, a method for changing a vertical scanning rate of progressively scanned image signals includes the following: estimating field motions between a current field and reference fields, said reference fields being prior to or next to the current field; restoring a missing line of the current field using information given from an optimal reference field if the optimal reference field unevenly matches to the current field, the optimal reference field being one of the reference fields having the shortest distance to the current field; estimating frame motions between adjacent frames using the progressively scanned image signals and the estimated field motions; proving a new composite image between the adjacent frames using the frame motions estimated; restoring the missing line of the current field by linearly interpolating lines located adjacent to the missing if the optimal reference field evenly matches to the current field; making smoother slanting lines of an image of the image signals using an edge-preserving filter; storing the current field and the reference fields in a field buffer; and storing the progressively scanned image signals in a frame buffer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Generally, in order to estimate the motion between two frames, an image is first divided into several sub-images, and then the motion of each divided sub-image is estimated. Correlations between a current sub-image (a sub-image in a current field) and sub-images of the reference fields spatially located close to the current field are initially evaluated, and the optimal sub-image of reference field that has the shortest distance from the current sub-image is determined.

Although the size of each sub-image is normally variable depending upon the size of the entire image or the volume of calculations, a size of 16 by 16 is typically used. However, this size is usually appropriate for an encoding process, but rather a smaller size is desired for handling interpolations or compensations of motions. A size of 8 by 8 is used in the present invention.

Since each line is missing between field lines of an image having an interlaced scanning format, it is impossible to estimate the motion of each field line using the conventional motion estimator. For this reason, it is necessary to extract information from the lines located adjacent (one above and one below) to the missing line so that the conventional (frame) motion estimator can be used instead of the field motion estimator. However, data from each line of the image is used to obtain the desired motion information as follows.

Figure 1:
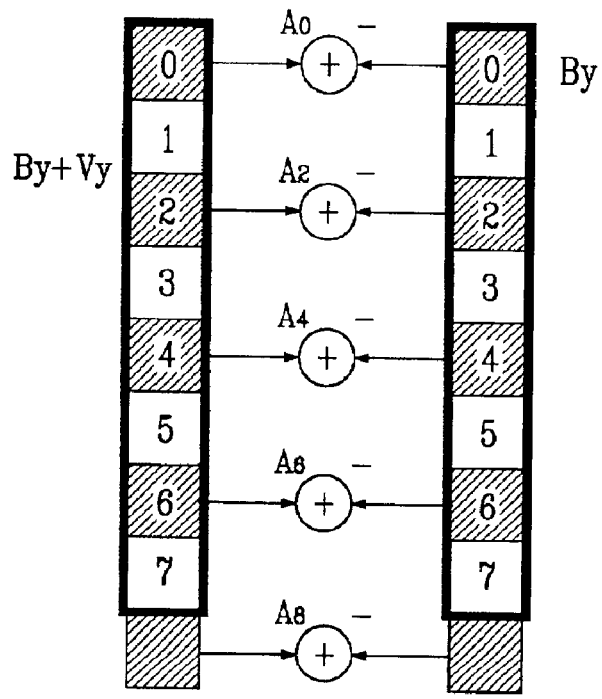
FIG. 1 illustrates a first type of comparison between a current sub-image and a reference sub-image in a field motion estimator (even match)
Figure 2:
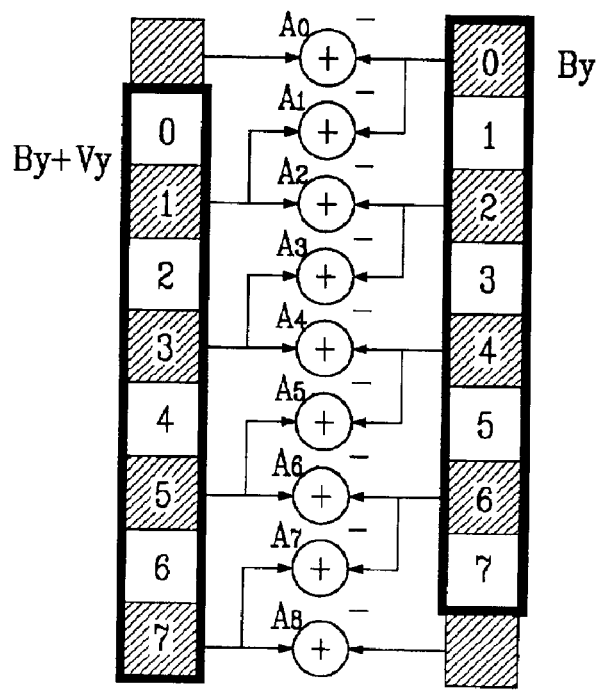
FIG. 2 illustrates a second type of comparison between a current sub-image and a reference sub-image in a field motion estimator (uneven match)

For estimating motions between a reference field and a current field in a field motion estimator, the reference field can be matched to the current field in two types as shown in FIG. 1 and FIG. 2 where $B_y$ and $V_y$ represent the vertical value of the sub-image and the vertical component value of the motion vector between the reference and the current sub-images. In FIG. 1, the reference sub-image evenly matches to the current sub-image: line 0 corresponds to line 0, line 2 corresponds to line 2, and so on. On the other hand, the reference sub-image unevenly matches to the current sub-image in FIG. 2: line 1 corresponds to line 2, line 2 corresponds to line 3, and so on. The correlation between the sub-images is evaluated by calculating the sum of absolute differences between the reference sub-image and each line of the current sub-image. For example, the sum of absolute differences of line 1 of the current sub-image for FIG. 1 and FIG. 2 are $$|A0|+|A0+A2|+|A2|+|A2+A4|+|A4|+|A4+A6|+|A6|+|A6+A8|$$

and $$|A0+A1|+|A1+A2|+|A2\ 30\ A3|+|A3+A4|+|A4+A5|+|A5+A6|+|A6+A7|+|A7+A8|,$$

respectively. The sum of absolute differences of the current sub-image is obtained by adding values of all lines.

Figure 3:
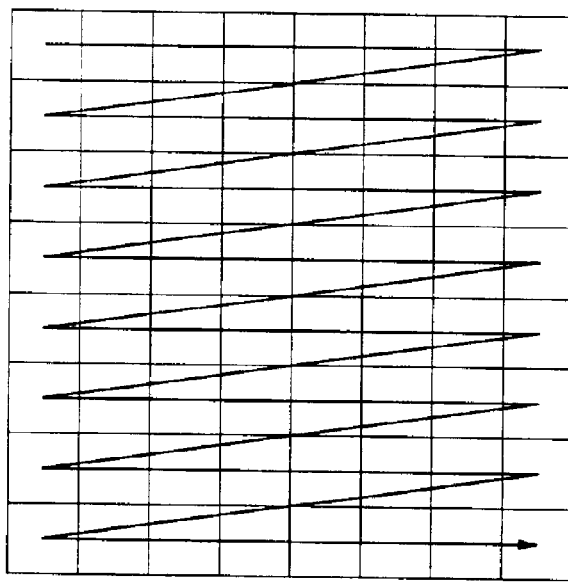
FIG. 3 illustrates a direction of horizontal computations.
Figure 4:
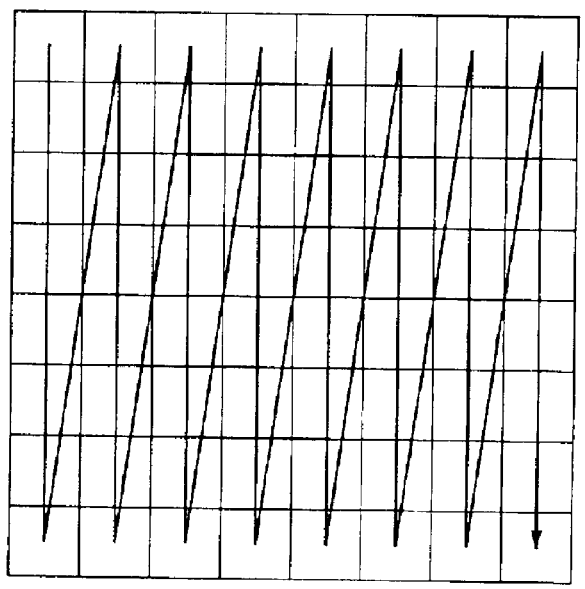
FIG. 4 illustrates a direction of vertical computations.

In general, computations are performed in a horizontal direction as shown in FIG. 3. However, computations of adjacent lines are repeated when they are performed in a vertical direction as shown in FIG. 1 and FIG. 2 so that the total calculation volume can be reduced. Therefore, computations should be performed in a horizontal direction if the present invention is embodied by hardware, and progressive computations should be performed in a vertical direction.

Figure 5:
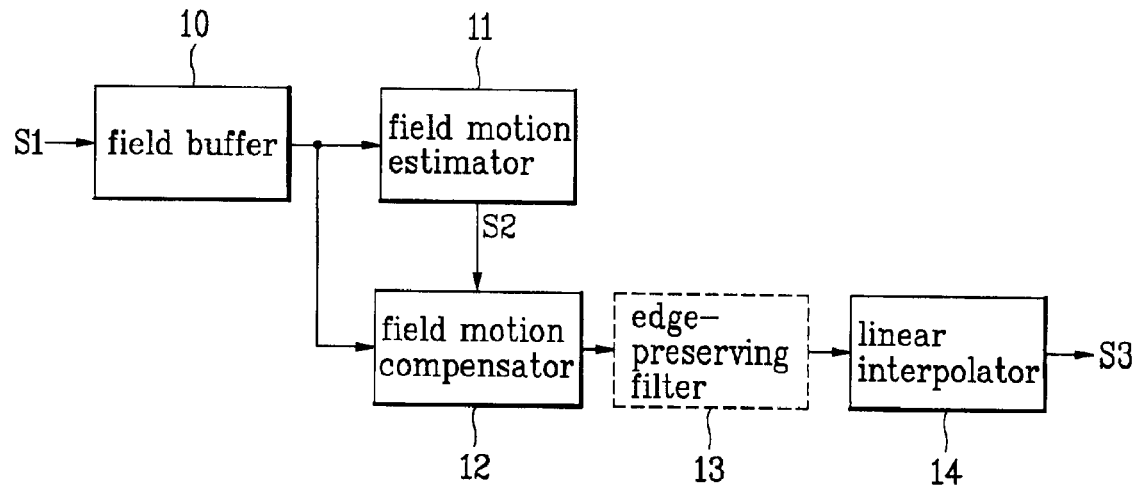
FIG. 5 illustrates the structure of an apparatus for converting the format of image signals to a progressive scanning according to the present invention.

FIG. 5 illustrates the structure of an apparatus for converting to a progressive scanning format using the field motion estimator. It includes a field buffer (10) that stores fields of an image having a interlaced scanning format, a field motion estimator (11) for estimating motions between a current field and reference fields (prior and next) outputted from the field buffer (10), a field motion compensator (12) that compensates the motion of missing lines of the current field by using the motion information of the optimal reference field having the shortest distance to the current field, an edge preserving filter (13) that generates the image in smoother slanting lines, and a linear interpolator that interpolates pixel values corresponding to the missing line of the current field by using the pixel values of the adjacent lines of the same field when there is no motion estimated from the field motion estimator (10).

The field buffer (10) receives its input data (S1) consisted of the current field and the reference fields. Four or more fields can be stored in the field buffer (10). The output data from the field buffer (10) are inputted to the field motion estimator (11) and the field motion compensator (12). When a pair of sub-images between the current field and an optimal reference field having the closest distance to the current field is similar to FIG. 1, the reference sub-image does not contain more information than the current sub-image does. However, if the pair of sub-images is matched as shown as FIG. 2, the current and the reference fields are supplementary to each other. In other words, the missing information can be estimated by using information in the optimal reference field. More accurate restoration of the missing line of the current frame can be achieved if matched shown as FIG. 3.

When the pair of sub-images has a FIG. 2 format, the pixel values of the missing line of the current field are estimated by taking the pixel values of the corresponding line of the optimal reference field (being closest to the current field). However, when the estimated motion has a FIG. 1 format, reference fields do not include necessary information. In this case, the linear interpolator (14) is used to estimate the pixel values of the missing line of the current field by linearly interpolating the pixel values of the adjacent lines located in the current field. As indicated, the linear interpolator (14) is used to determine the values of pixels that are not processed by the field motion compensator (12). Therefore, the output S3 has the progressive scanning format.

When slanting lines are processed through the linear interpolator (14), they may be appeared in a step form. This results a poor visibility and image quality. For this reason, the edge-preserving filter (13) is placed to perform an additional edge-preserving process on certain pixels before image data are inputted to the linear interpolator (14).

Figure 7:
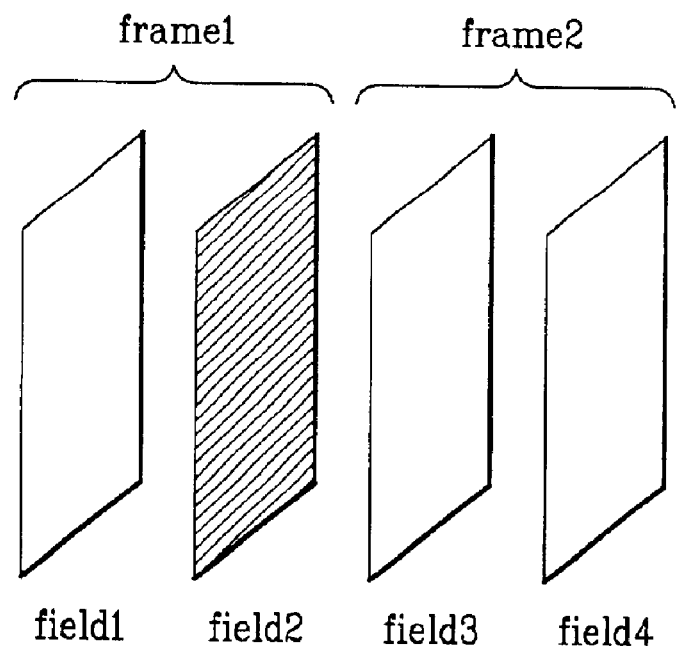
FIG. 7 illustrates a first example set of a current field and reference fields.
Figure 8:
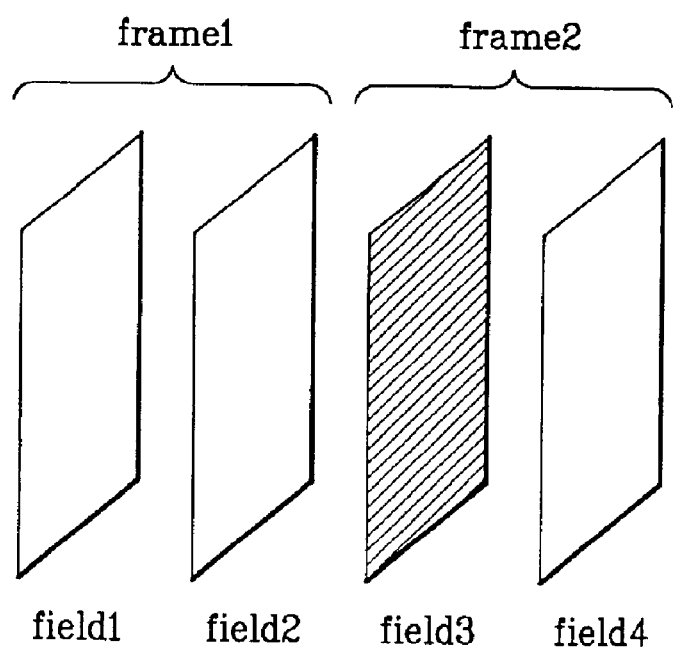
FIG. 8 illustrates a second example set of a current field and reference fields.

Both of FIG. 7 and FIG. 8 illustrate a current field and reference fields, but their orders are different. The shaded field is the current field, and all others are reference fields.

According to the FIG. 7, one preceding field and two following fields are used as the reference fields. On the other hand, two preceding fields and one following field are used as the reference fields according to the FIG. 8. In both cases, generally, the parity of one of the reference fields is same as the parity of the current field, and the parities of others are different. However, they do not have to be in this manner.

Figure 6:
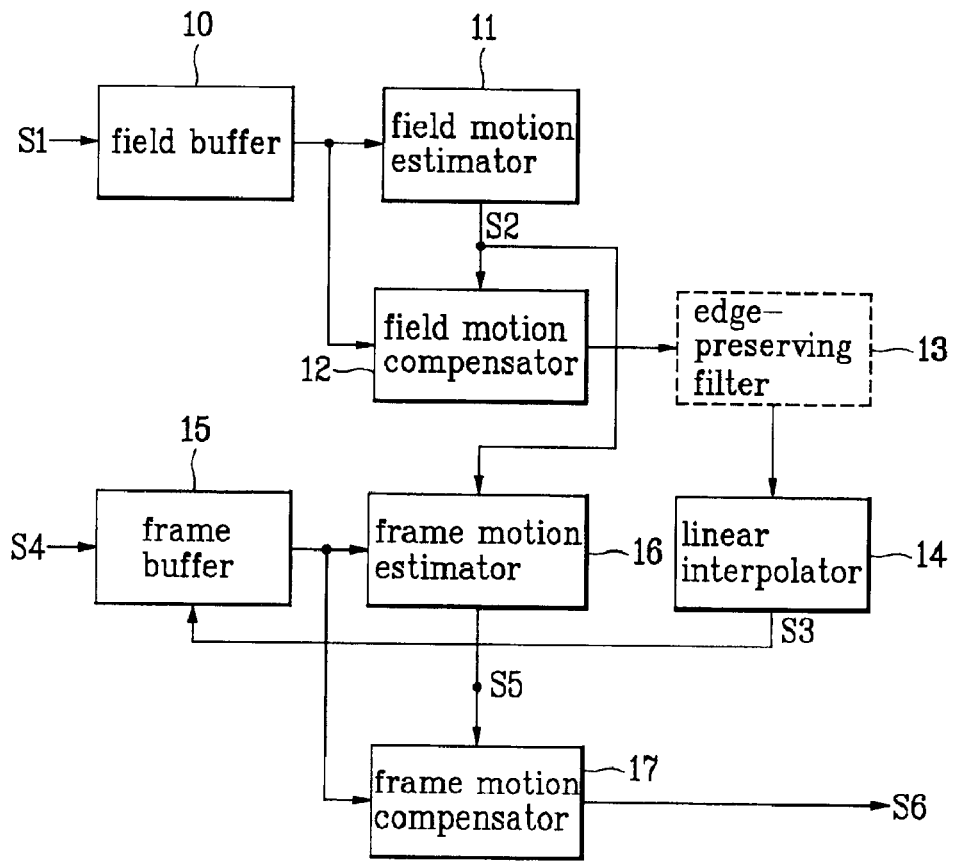
FIG. 6 illustrates the structure of an apparatus for changing the vertical scanning rate of progressively scanned image signals according to the present invention.

FIG. 6 illustrates a vertical scanning rate (frame rate) converter using the progressive scanning format converting apparatus shown in FIG. 5. According to FIG. 6, the vertical scanning rate converter includes the buffer field (10), the field motion estimator (11), the field motion compensator (12), an edge-preserving filter (13), the linear interpolator (14), and additionally, a frame buffer (15) that stores an output image (S3) having the progressive scanning format, a frame motion estimator (16) that receives the output information generated from the frame buffer (15) and the field motion estimator (11) and estimates the motion between the frames, a frame motion compensator (17) that receives the output from the frame motion estimator (16) and the frame buffer (15) and provides a composite image between the frames.

Accordingly, image signals having the progressive scanning format (S4) is stored in the frame buffer (15) without being processed in the format conversion process. However, the image signals having the interlaced scanning format (S1) are processed in the format conversion process and converted to the image signals having the progressive format (S3). The converted signals (S3) are stored in the frame buffer. The frame motion estimator (16) then receives the image signals having the progressive format (S3 or S4) and generates motion vectors between the frames. If the format conversion process has been performed previously, the frame motion estimator uses the field motion information (S2) for determining its initial estimated value. The frame motion compensator (17) controls the size of the motion vectors based on a ratio of a distance between a desired location and the reference frame to a distance between the desired location and the current frame. Thereafter, it composes an image (S6) between the current and reference fields by performing motion interpolations. When S3 and S6 are outputted in a given order, a moving image now has a new vertical frequency (vertical scanning rate).

As explained above, the apparatus and method of converting to the progressive scanning format and the corresponding vertical scanning rate converter has following advantages. First, both of the information of the current field and the reference fields are optimally utilized so that the estimated values are closer to the real values than the estimated values obtained only from the current field information by interpolations. Therefore, the vertical resolution of the image is greatly enhanced. Secondly, improved spatial and time resolutions of moving images can be achieved by using the apparatus for converting to the progressive scanning in the vertical scanning rate converter.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A scan conversion apparatus comprising:

at least one field buffer;

at least one field motion estimator receiving image input of interlaced scanning format from said at least one field buffer, said image input including a current field and at least one reference field;

at least one field motion compensator operatively coupled between said at least one field buffer and said at least one field motion estimator, said at least one field motion compensator adapted to restore at least one missing line of said current field using motion information from an optimally spaced adjacent reference field when said optimally spaced adjacent reference field is unevenly matched to said current field;

at least one linear interpolator adapted to restore at least one missing line of said current field when said optimally spaced adjacent reference field is evenly matched to said current field;

at least one edge-preserving filter operatively coupled between said at least one field motion compensator and said at least one linear interpolator, said at least one linear interpolator producing image output of progressive scanning format;

at least one frame buffer adapted to store said produced image output and image input of progressive scanning format; and at least one frame motion estimator operatively coupled between said at least one frame buffer and said at least one field motion estimator and adapted to generate motion vectors between adjacent image frames.

2. The scan conversion apparatus of claim 1 further comprising:

at least one frame motion compensator operatively coupled between said at least one frame buffer and said at least one frame motion estimator and adapted to control the size of said motion vectors.

3. A scan conversion apparatus comprising:

at least one field buffer;

at least one field motion estimator receiving image input of interlaced scanning format from said at least one field buffer, said image input including a current field and at least one reference field;

at least one field motion compensator operatively coupled between said at least one field buffer and said at least one field motion estimator, said at least one field motion compensator adapted to restore at least one missing line of said current field using motion information from an optimally spaced adjacent reference field when said optimally spaced adjacent reference field is unevenly matched to said current field;

at least one linear interpolator adapted to restore at least one missing line of said current field when said optimally spaced adjacent reference field is evenly matched to said current field;

at least one edge-preserving filter operatively coupled between said at least one field motion compensator and said at least one linear interpolator, said at least one linear interpolator producing image output of progressive scanning format;

at least one frame buffer adapted to store said produced image output and image input of progressive scanning format;

at least one frame motion estimator operatively coupled between said at least one frame buffer and said at least one field motion estimator and adapted to generate motion vectors between adjacent image frames; and at least one frame motion compensator operatively coupled between said at least one frame buffer and said at least one frame motion estimator and adapted to control the size of said motion vectors.

4. The scan conversion apparatus of claim 3 wherein said at least one frame motion compensator controls the size of said motion vectors based on a ratio of a distance between a desired frame location and a reference frame location to a distance between said desired frame location and a current frame location.

5. The scan conversion apparatus of claim 4 wherein said at least one frame motion compensator is adapted to produce composite image output between adjacent frames.

6. The scan conversion apparatus of claim 5 wherein said at least one linear interpolator and said at least one frame motion compensator are adapted to produce image output in at least one order, said at least one order resulting in a moving image of a vertical scanning rate being different from the vertical scanning rate of progressively scanned image signals being stored in said at least one frame buffer.

* * * * *